(12) United States Patent
Polyakov

(10) Patent No.: US 7,315,321 B2
(45) Date of Patent: Jan. 1, 2008

(54) SYSTEM OF AND METHOD FOR WARNING ABOUT UNAUTHORIZED OBJECTS ATTACHED TO VEHICLE BOTTOMS AND/OR ADJOINING AREAS

(76) Inventor: Leonid Polyakov, 1 Shentland Ct., Dix Hills, NY (US) 11746

( * ) Notice: Subject to any disclaimer, the term of this patent is extended or adjusted under 35 U.S.C. 154(b) by 330 days.

(21) Appl. No.: 10/375,977

(22) Filed: Feb. 28, 2003

(65) Prior Publication Data

US 2003/0222789 A1  Dec. 4, 2003

(51) Int. Cl.
*H04N 7/18* (2006.01)
(52) U.S. Cl. ..................................................... 348/148
(58) Field of Classification Search ................ 348/61, 348/62, 63, 64, 77, 73, 82, 143–149; 345/8; 134/6; 340/870.16, 425.5, 907; 382/104, 382/106; *H04N 7/18, 7/12; G06F 15/64*
See application file for complete search history.

(56) References Cited

U.S. PATENT DOCUMENTS

| 5,091,924 | A | * | 2/1992 | Bermbach et al. ............ 378/57 |
| 5,764,683 | A | * | 6/1998 | Swift et al. .................... 378/57 |
| 6,032,522 | A | * | 3/2000 | Clark et al. .................... 73/146 |
| 6,249,567 | B1 | * | 6/2001 | Rothschild et al. ........... 378/88 |
| 6,324,749 | B1 | * | 12/2001 | Katsuura et al. .............. 29/703 |
| 6,601,022 | B2 | * | 7/2003 | Zerwekh et al. ............ 702/188 |
| 6,856,344 | B2 | * | 2/2005 | Franz ......................... 348/143 |
| 6,972,693 | B2 | * | 12/2005 | Brown et al. ................ 340/907 |
| 2002/0128985 | A1 | * | 9/2002 | Greenwald .................. 705/400 |

FOREIGN PATENT DOCUMENTS

| EP | 000485192 A2 | * | 5/1992 |
| GB | 2 248 692 A | * | 4/1992 |
| GB | 2 271 483 A | * | 4/1994 |

* cited by examiner

*Primary Examiner*—Tung Vo
(74) *Attorney, Agent, or Firm*—I. Zborovsky

(57) ABSTRACT

A method of and a system for warning about an unauthorized object attached to a bottom part of the vehicle includes storing images of vehicles or the data corresponding to the images in server means, examining a bottom of a vehicle by image producing means, transmitting from the image producing means an image of a bottom of a vehicle or the data corresponding to the images to the server means, comparing the transmitted images of the bottom of the vehicle or the data corresponding to the images with a stored image of a bottom of a corresponding vehicle or the data corresponding to the images, and producing a signal indicative of whether the bottom of the examined vehicle contains an unauthorized object or does not contain an unauthorized object.

8 Claims, 2 Drawing Sheets

SYSTEM OF AND METHOD FOR WARNING ABOUT UNAUTHORIZED OBJECTS ATTACHED TO VEHICLE BOTTOMS AND/OR ADJOINING AREAS

BACKGROUND OF THE INVENTION

The present invention relates to a system of and method for warning about unauthorized objects attached to vehicle bottoms.

Millions of vehicles provide everyday transportation of people and loads. In some instances the vehicles are used by criminal elements to transport narcotics, and in some cases bombs and other explosive devices are attached to bottom parts of the vehicles for terrorists acts. It is to be understood that it is extremely important to examine the bottom parts of the vehicles and to determine whether any unauthorized objects are attached to the vehicles in this area. In order to achieve this objective, at border crossings and other locations corresponding officials use mirrors with which they examine some parts of a bottom of the vehicle to determine whether any unauthorized objects are attached to the bottoms. It is believed that this approach can be significantly improved.

SUMMARY OF THE INVENTION

Accordingly, it is an object of present invention to provide a system of and method for warning about unauthorized objects attached to vehicle bottoms, which avoid the disadvantages of the prior art.

In keeping with these objects and with others which will become apparent hereinafter, one feature of the present invention resides, briefly stated, in a method of warning about an unauthorized object attached to a bottom part of the vehicle, comprising the steps of storing images of bottoms and/or adjoining parts of vehicles in server means; examining a bottom of a vehicle and/or adjoining parts by image producing means; transmitting from the image producing means an image of a bottom of a vehicle and/or adjoining parts to the server means; comparing the transmitted image of the bottom of the vehicle and/or adjoining parts with a corresponding stored image of a bottom and/or adjoining parts of a corresponding vehicle; and producing a signal indicative of whether the bottom of the examined vehicle contains and/or adjoining parts an unauthorized object or does not contain an unauthorized object.

It is another feature of present invention to provide a system which has server means for storing images of vehicles and/or adjoining parts; examining a bottom of a vehicle and/or and transmitting an image of a bottom of a vehicle and/or adjoining parts to the server means which compare the transmitted image of the bottom of the vehicle and/or adjoining parts with a corresponding stored image of a bottom and/or adjoining parts of a corresponding vehicle; and means for producing a signal indicative of whether the bottom of the examined vehicle and/or adjoining parts contains an unauthorized object or does not contain an unauthorized object.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
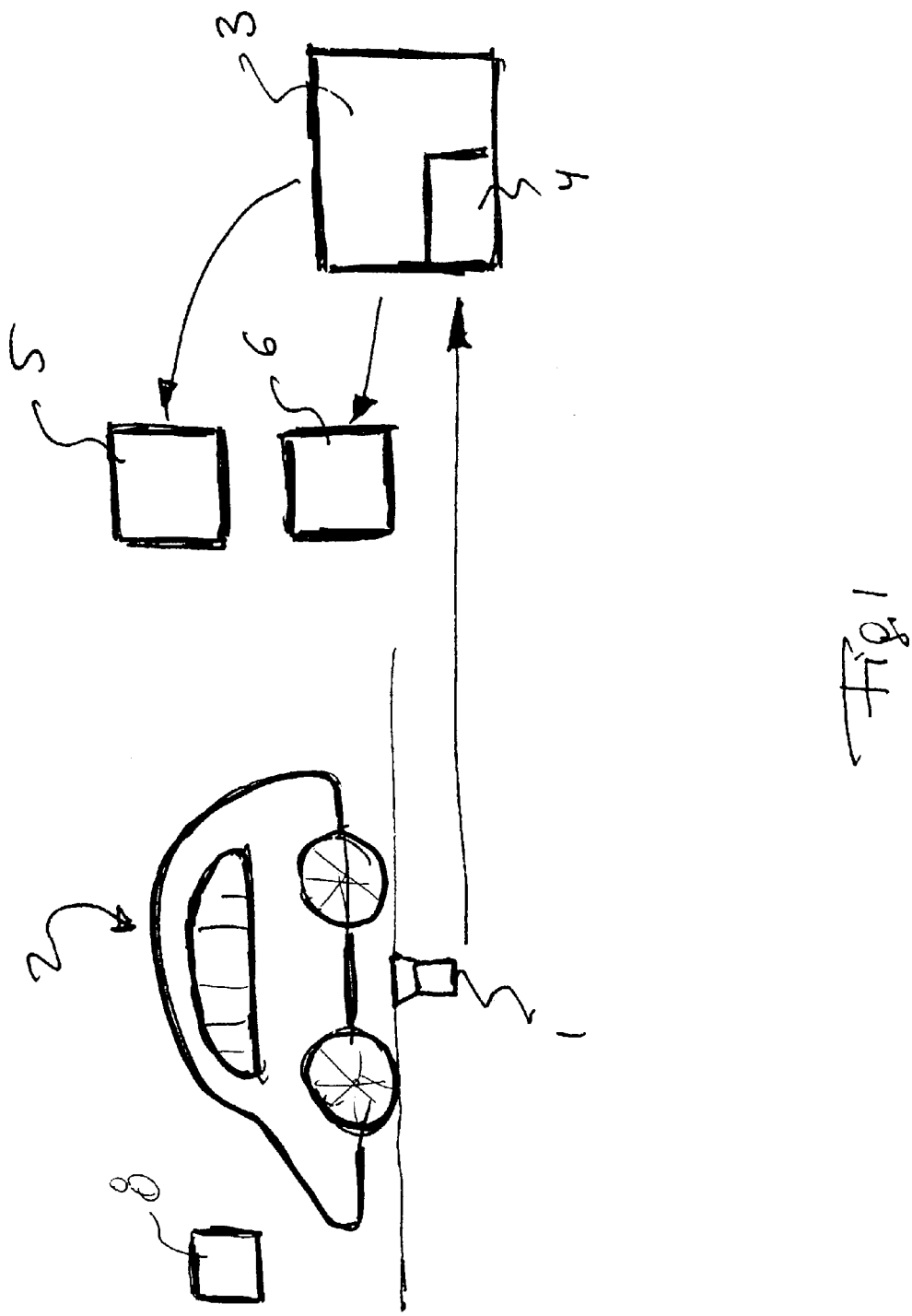
FIG. 1 is a view schematically illustrating a system of and method for warning about unauthorized objects attached to vehicle bottoms.

A system in accordance with the present invention which operates in accordance with the inventive method has a device for producing an image of a lower part of the vehicle, in particular a bottom and/or adjoining areas. The device is identified as a whole with reference numeral 1. This device can be a camera, a video camera, a scanning device or any other device which can observe a bottom of a vehicle 2 and adjoining areas to produce an image of the same. The device 1 can be arranged at a location which is convenient for optical observation of the bottom of the vehicle. For example it can be located in a roadway so that its vehicle observing or examining part does not project upwardly beyond the roadway so as not to be damaged.

The system further includes server means which is identified with reference numeral 3 and can be formed, for example, as a computer and the like. The image producing device 1 communicates with the server means 3 through any possible communication links, for example through a cable, wirelessly, etc. The server means stores images of the bottoms and/or adjoining areas of all vehicles, in correspondence with their make, year, etc. The server means 3 include a comparison unit 4, for the purpose which will be explained herein below.

In operation when the image producing device optically examines or observes the bottom and adjoining areas of the vehicle 2 and sends the produced optical image or data corresponding to the produced image, for example digital data, etc. to the server means 3, the comparison unit 4 of the server means 3 compares the optical image or the data corresponding to the images or the data stored in the server means 3 and that determines by the image producing device 1 whether they are identical or not. If they are identical, this means that no unauthorized object are attached to the bottom of the vehicle or adjoining areas. If the images are not identical, the server moans 3 produces a signal indicative of the presence of the unauthorized object on the bottom or in the adjoining areas of the vehicle 2.

The signal indicative of the presence of the unauthorized object on the bottom or adjoining areas of the vehicle can be submitted to a station 5 which is at the disposal of a governmental official, for example border patrol, etc. The signal can show the official, for example on a display of his computer that there is no unauthorized objects or there is an unauthorized object on the bottom of the vehicle or the adjoining areas. The signal can be for example also in form of a green light or a red light, so that when the signal is red light the red light appears on an indicator adjacent to a gate, intersection, etc. to show that the vehicle is allowed to pass or is not allowed to pass correspondingly.

The signal can be also transmitted to an actuator which is identified with reference numeral 6. The actuator can be a gate, a barrier and the like on the way of the vehicle. If the server means 3 determines that there is no unauthorized object on the bottom of the vehicle and/or in adjoining areas, the signal opens the gate, moves the barrier, etc to allow the vehicle to pass. However, if the server means determines that there is an unauthorized object on the bottom of the vehicle or in adjacent areas, the actuator 6 closes the gates, moves the barrier to prevent passage of the vehicle, etc.

Figure 2:
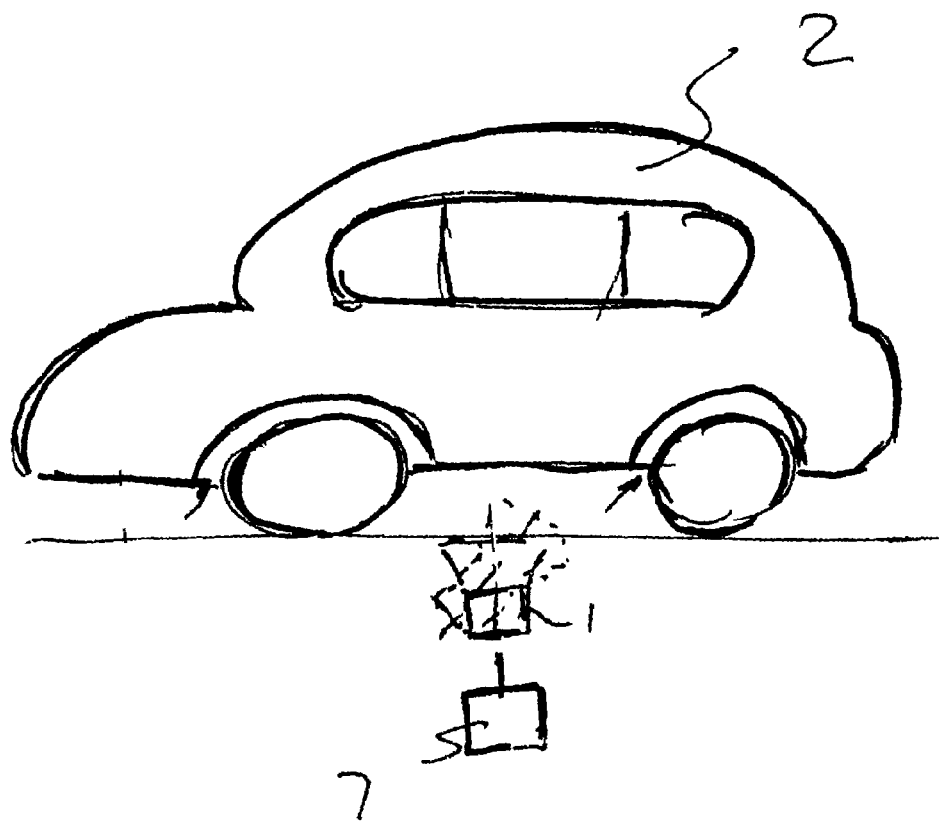
FIG. 2 is a view showing a vehicle which is examined in accordance with the present invention.

As shown in FIG. 2, the image producing device can be movable or turnable so as to more clearly optically observe the bottom of the vehicle or the adjoining areas. This is important to observe such areas as for example above the wheels, beyond the brackets which support the wheel axles on the chassis, etc. The device 1 for this purpose can be provided with a moving or turning means identified with reference numeral 7. Therefore, when the vehicle passes over the device 1, it turns so that the device "looks" into areas, which deviate from the flat surface of the bottom of the vehicle.

For example, it can be shown on the display at the station 5 that the object is located just behind the front right wheel.

In order to improve accuracy of determination of absence or presence of an unauthorized object, it is possible to provide comparison of a produced image by the image producing device of a vehicle of a certain type, with the optically stored image of the same type (make, year, etc.). For this purpose either identification of the vehicle type can be produced by an official, or an additional device 8 can be provided which observes the vehicle to determine its type (make, year, etc.), and transmits the data to the server means, so that latter compares the produced image with the stored image of the vehicle of the same type (observed bottom of Ford Explorer 1989 with the stored image of the same).

It will be understood that each of the elements described above, or two or more together, may also find a useful application in other types of constructions differing from the types described above.

While the invention has been illustrated and described as embodied in a system of and method for warning about unauthorized objects attached to vehicle bottoms, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A system for warning about an unauthorized object attached outside a vehicle on a bottom and/or on adjoining areas of the vehicle, comprising server means for storing optical images of bottoms and/or adjoining areas of vehicles or the data corresponding to the optical images; image producing means for optically examining a bottom and/or adjoining areas of the vehicle by optically observing the bottom and/or adjoining areas of the vehicle outside of the vehicle and transmitting an optical image of a bottom and/or adjoining areas of a vehicle or the data corresponding to the optical images to the server means, which server means include a comparison unit which is configured for automatically without a user comparing the transmitted optical image of the bottom and/or adjoining areas of the vehicle or the data corresponding to the optical images with stored optical images of a bottom and/or adjoining areas of a corresponding vehicle or the data corresponding to the optical images so as to automatically without a user distinguish a bottom of a vehicle and/or an adjoining area of the vehicle on which an unauthorized object is attached, from a bottom of a vehicle and/or an adjoining area of the vehicle on which an unauthorized object is not attached; and which server means is configured so that, based on results of the automatic without a user comparison, automatically without a user producing a signal indicative of whether on the bottom and/or on adjoining areas of the examined vehicle outside of the vehicle an unauthorized object is located or an unauthorized object is not located so that not only the storing of the optical images of the bottoms and/or adjoining areas and the optically observing of the bottoms and/or adjoining areas and transmitting of the optical images are performed, but also both the comparison and the indication signal are produced by said server means without a user.

2. A system as defined in claim 1, wherein said image producing means produce optical images at different points of view so as to optically examine the bottom and/or adjoining areas of the vehicle as well.

3. A system as defined in claim 1; and
further comprising means for submitting a result of the comparison by the server means to a station responsible for examining the vehicle.

4. A system as defined in claim 1; and further comprising means for producing a warning signal in the event of determination of presence of an unauthorized object.

5. A system as defined in claim 1; and further comprising means for providing a signal for allowing or not allowing a passage of the vehicle depending on results of the comparison.

6. A system as defined in claim 1; and further comprising means for determining and indicating a specific location of the unauthorized object on the bottom and/or adjoining areas of the vehicle.

7. A system as defined in claim 1, wherein said image producing means include a device selected from the group consisting of a camera, a video camera, and a scanning device which can optically observe the bottom and/or the adjoining areas of the vehicle.

8. A system as defined in claim 1, wherein said image producing means include a device which is located in a roadway, so that its vehicle observing or examining part does not project upwardly beyond the roadway so as not to be damaged.

* * * * *